TRANSISTORIZED HIGH SPEED BISTABLE MULTIVIBRATOR FOR DIGITAL COUNTER BIT

Filed Feb. 6, 1964

INVENTORS.
RICHARD A. LINDER
RICHARD G. SCHNEIDER
BY H. H. Losche
ATT'YS.

United States Patent Office 3,311,754
Patented Mar. 28, 1967

3,311,754
TRANSISTORIZED HIGH SPEED BISTABLE MULTIVIBRATOR FOR DIGITAL COUNTER BIT

Richard A. Linder, Baltimore, and Richard G. Schneider, College Park, Md., assignors, by mesne assignments, to the United States of America as represented by the Secretary of the Navy Filed Feb. 6, 1964, Ser. No. 343,169
10 Claims. (Cl. 307—88.5)

This invention relates to multivibrators and more particularly to a transistor bistable multivibrator for use as a digital counter bit that is capable of producing switching speeds in the nanosecond time range.

Data processing equipment for target detection radars and range radars requires considerable time in processing target information which is a disadvantage in the evaluation of targets produced by modern high speed aircraft, missiles, and other fast moving target objects. The speed and accuracy of radar systems have been increased somewhat by the incorporation of digital counting or computing means in the data processing circuitry, but there is always the need for reducing the time of operation of data processing equipment in order to increase the capabilities of defense from radar equipment. One time consuming component of data processing equipment of the digital counter or computer means is the counter bit of which the most universally accepted is the bistable multivibrator which must switch as digital information is applied thereto. It is the intention of this invention to speed up the operating time of the digital counter bit which would speed up the overall operation of the digital computer or counter in the data processing component of the radar target detection or ranging system.

In the present invention a transistor multivibrator is used which operates as a conventional multivibrator but utilizes late developments of high speed silicon N-P-N type transistors to speed up multivibrator operation. It is also desirable in the speed up operation to produce triggering of the multivibrator by utilizing the leading edge of the triggering pulse which is difficult to accomplish. The multivibrator has a gating circuit for each of its two inputs which gates are coupled in common from a common triggering source of pulses, such as a source of clock pulses. The transistor multivibrator is so designed that clock pulses having a pulse repetition frequency (PRF) from zero to 20 megacycles may be used. The two outputs of the bistable multivibrator are cross coupled to the inputs through the gating circuits and these gating circuits must not reverse until each clock pulse has decayed. The clock pulse width should be less than the total switching time of the counter bit, but in most cases it would be impractical to have a clock pulse less than 15 nanoseconds (ns.) (1 ns.$=10^{-9}$ second) as would be needed in the application for a digital counter bit. Accordingly, to avoid false triggering or to avoid secondary output pulses from the counter bit, a delay is needed in the cross coupling of the two outputs of the bistable multivibrator to the inputs thereof. In this invention a radio frequency (RF) coil effectively provides the delay that is needed and has the advantage of being physically small and inexpensive. Another advantage of using a coil for this delay is that the electrical value depends on the amount of delay that is required for the particular application. If a large triggering pulse width is required, then a large electrical value can be used per coil without affecting the rise and fall times of the counter bit output logic signals. On the other hand, if a smaller triggering pulse width is required, then a smaller value coil is chosen. The electrical value of the coil will determine the maximum PRF that can be obtained from this counter bit. It has been found of known multivibrators that operation up to 100 megacycles (mc.) has been achieved for commercial applications. In the present invention the use of high speed silicon N-P-N type transistors and transistor inverter amplifiers along with delay elements in the control of the gating circuits provide a bistable multivibrator counter bit capable of completing its switching operation within a matter of a few nanoseconds. It is therefore a general object of this invention to provide a transistorized high speed bistable multivibrator for digital counter bits capable of completing each switching operation in the matter of a few nanoseconds without producing internal switching signals and false logic signals.

These and other objects and the attendant advantages, features, and uses of this invention will become more apparent to those skilled in the art as a more detailed description proceeds when considered along with the accompanying drawing, in which.

Figure 1:
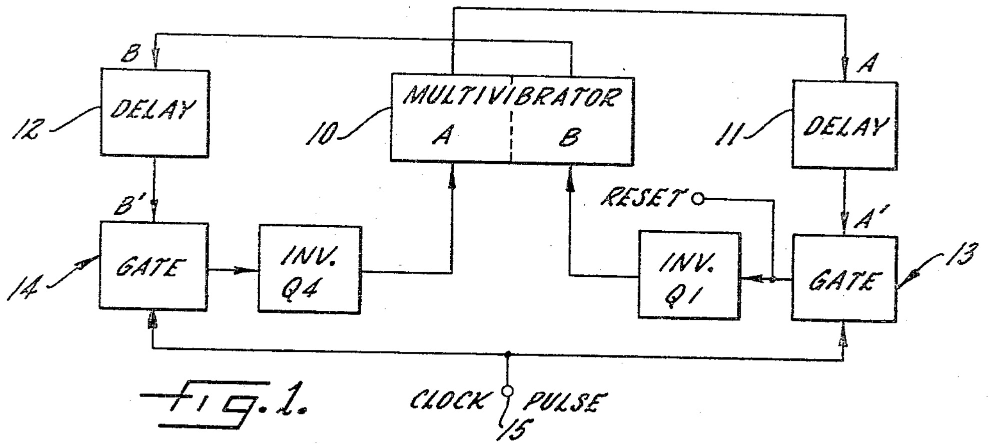
FIGURE 1 is a functional block circuit diagram of the invention.
Figures 2, 3, 4:
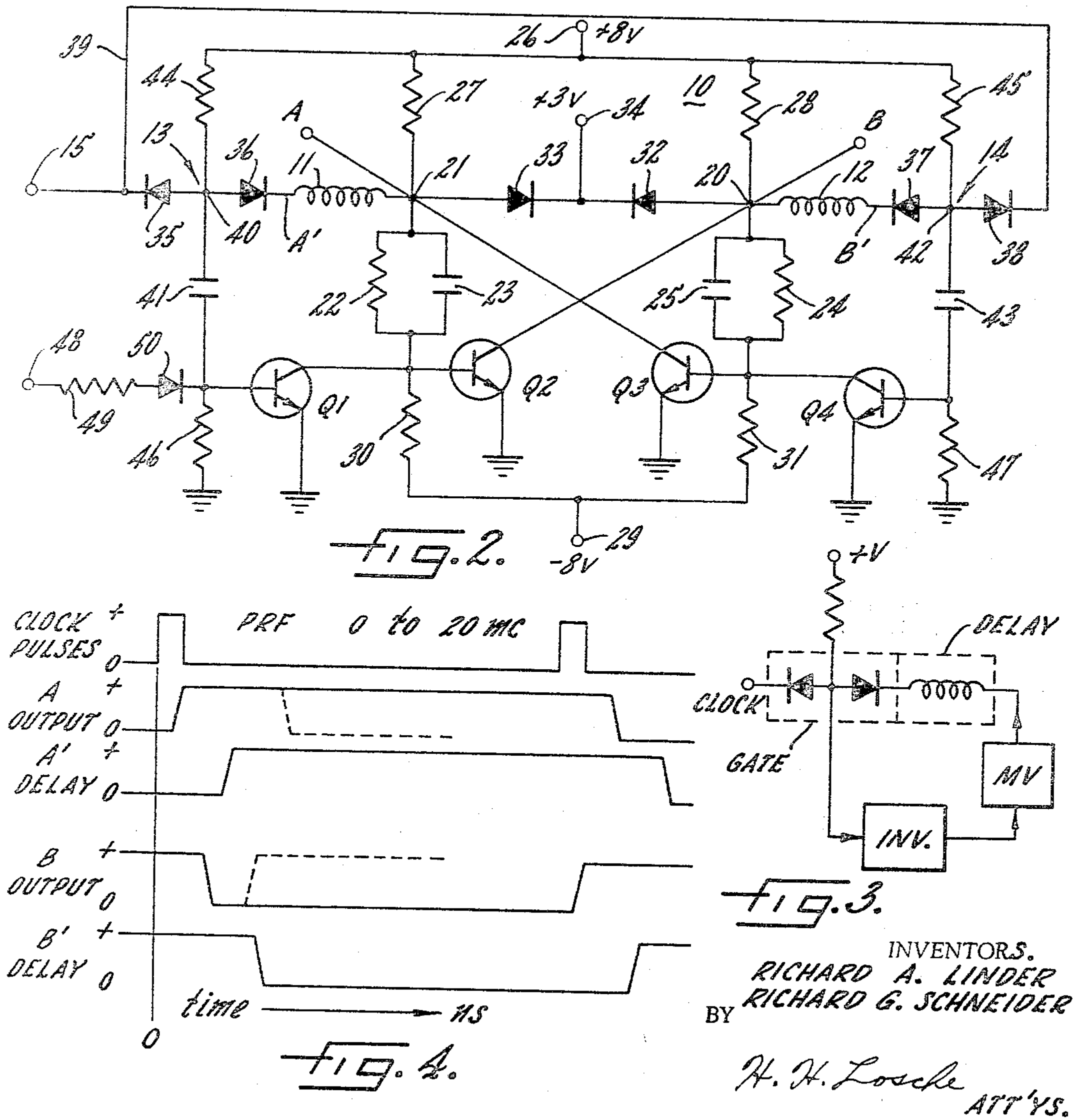
FIGURE 2 is a circuit schematic wiring diagram of the functional block diagram of FIGURE 1.
FIGURE 3 is a partial schematic and partial block diagram of one basic gating network used in FIGURE 2.
FIGURE 4 illustrates voltage waveforms taken from various terminals in FIGURE 2 and aligned for comparison along the abscissa progressing in time of nanoseconds.

Referring more particularly to FIGURE 1, a multivibrator 10 is shown in block divided into portions A and B illustrating the two sections of a conventional multivibrator. The output A of the multivibrator section A is coupled as an input to a delay element 11 to produce a delayed output signal A′ applied to a gating circuit 13. The voltage output of the multivibrator section A is shown in FIGURE 4 as well as the delayed output A′, as will be more fully described hereinbelow. The output of the gating circuit 13 is applied through an inverter amplifier Q1 the output of which is to the opposite B section of the multivibrator 10. The same is true for the B section output of multivibrator 10, this output being applied through a delay element 12 to produce the delayed output B′ applied to the gating circuit 14. The output of this gating circuit B section is applied through an inverter amplifier Q4 to the A section of the multivibrator 10. A common second input to each of the two gating circuits 13 and 14 is from a terminal point 15 to which may be applied an external PRF source, such as a clock pulse source.

Referring more particularly to FIGURE 2, the multivibrator 10 includes two high speed silicon N-P-N type transistors Q2 and Q3, both of which are emitter grounded. The collector of transistor Q2 is coupled directly to a terminal point 20 while the collector of transistor Q3 is coupled directly to the terminal point 21, terminal point 21 being the A output of the multivibrator and terminal point 20 being the B output of the multivibrator. Terminal point 21 is coupled through a parallel network consisting of a resistor 22 and capacitor 23 to the base of transistor Q2. In like manner, the terminal point 20 is coupled through a parallel network consisting of a resistor 24 and a capacitor 25 to the base of transistor Q3. The collectors of transistors Q2 and Q3 have a collector voltage applied thereto from a terminal 26 supplying a positive voltage through load resistors 27 and 28, respectively. The bases of transistors Q2 and Q3 are biased from a negative voltage source at terminal 29 through base biasing resistors 30 and 31, respectively. The terminals 20 and 21 are limited in positive voltage by diodes 32 and 33, respectively, having their cathodes coupled in common to a positive voltage source applied at terminal 34. The positive voltage applied at terminal 26 is higher than the positive voltage applied at terminal 34, these voltages being shown as 8 volts applied at terminals 26 and 3 volts applied at terminal 34 purely for the purpose of illustrating one operative example, although other voltages may be applied to acquire other voltage logic levels at 20 and 21, as desired. Terminal 29 is illustrated as having −8 volts applied thereto to provide a bias on the bases of transistors Q2 and Q3 for the purpose of illustrating one operable example herein.

Gating circuits 13 and 14 each utilizes a pair of anode back-to-back silicon rectifiers. Gating circuit 13 consists of silicon rectifiers 35 and 36 while gating circuit 14 consists of silicon rectifiers 37 and 38. The cathode of silicon rectifier 36 is coupled to one terminal of an RF coil 11, the opposite end of which is coupled to terminal 21, while the cathode of silicon rectifier 37 is coupled to one terminal of an RF coil 12, the opposite end of this coil being connected to terminal 20. The RF coils 11 and 12 each constitutes a delay element for the output signals A and B from the multivibrator 10 to the gating circuits 13 and 14, respectively. The cathodes of silicon rectifiers 35 and 38 are coupled in common by a conductor means 39, this conductor 39 being coupled to terminal 15 to which is supplied the input PRF or clock pulses.

The output terminal of gating circuit 13 consists of the common anode back-to-back coupling terminal 40 which output terminal is capacitor coupled through a capacitor 41 to the base of an inverter amplifier transistor Q1, the collector output of which is coupled to the base of transistor Q2. In like manner, the back-to-back common anode output of gating circuit 14 is capacitor coupled through a capacitor 43 to the base of the inverter amplifier transistor Q4, the collector output of which is directly connected to the base of transistor Q3. The emitters of the transistor inverter amplifiers Q1 and Q4 are coupled in common to a fixed or ground potential. The output terminals 40 and 42 of the gating circuits 13 and 14, respectively, are each biased from the voltage source at 26 through biasing resistors 44 and 45. The base of the inverter amplifier transistor Q1 and of the inverter amplifier transistor Q4 are each biased through base biasing resistors 46 and 47 from the fixed or ground potential. In this manner terminals 40 and 42 are adapted to retain a voltage thereon equal to the voltage limited through the limiting diodes 32 and 33 from the voltage source 34, except where one of the transistors Q2 or Q3 is conducting. The bases of the inverter amplifier transistors Q1 and Q4 will normally rest at zero potential unless a signal is applied to be developed across the resistors 46 or 47.

In order that each counter bit of a string of counter bits in a digital computer or counter is initially started with all counter bits in the same bistable state, a reset input is applied at terminal 48. The reset input from terminal 48 is applied through a resistance 49 and a diode 50 to the base of only one of the inverter amplifier transistors Q1 or Q4, it being applied to the base of transistor Q1 in this application. Any positive pulse applied at terminal 48 will reset the counter bit shown in FIGURE 2 to one of its stable states regardless of the stable state in which the counter bit is resting at the time the reset pulse is applied.

FIGURE 3 illustrates the basic gating network simplified from that shown in FIGURE 2 to set out the relation of the delay RF coil, the gating circuit to which clock pulses are applied, the inverter amplifier, and the multivibrator. The operation of the schematic circuit shown in FIGURE 2 of the counter bit with FIGURE 3 facilitating the understanding and operation will be described hereinbelow in detail.

*Operation*

In the operation of the bistable multivibrator counter bit shown in FIGURE 2, let it be assumed first that a positive pulse has been applied to terminal 48 to reset the bistable multivibrator 10 in one of its stable states. The positive pulse from terminal 48 will be conducted through resistor 49 and diode 50 to the base of the inverter amplifier transistor Q1 placing this transistor into conduction which reduces the base voltage of transistor Q2 to substantially zero since the emitter of transistor Q1 is directly coupled to ground potential. If transistor Q2 had been in its conducting state, reduction of its base voltage to substantially zero would produce equal potential across its base and emitter and would therefore cut off collector-emitter conduction. On the other hand, if transistor Q2 had not been in a conductive state, the conduction of transistor Q1 would have made no change in the conduction state of transistor Q2. The nonconductive state of transistor Q2 allows terminal 20 to stabilize at substantially 3 volts, this voltage being applied from terminal 26 and limited by the limiting diode 32 to 3 volts at terminal 34. The base of transistor Q3, being in a voltage divider circuit of which resistors 24 and 28 are of lower resistance than resistor 31, produces a positive voltage on the base of transistor Q3 to place this transistor in conduction. The conduction of transistor Q3 holds terminal 21 to near zero voltage by virtue of the emitter of transistor Q3 being coupled to ground and the only resistance in the circuit from terminal 21 to ground being the resistance of transistor Q3. Holding of the terminal 21 to near ground potential maintains the base of transistor Q2 to near ground potential which holds transistor Q2 in a nonconductive state.

Now let it be assumed that the first clock pulse, as appears in FIGURE 4, is applied to terminal 15 in FIGURE 2 which impresses this clock pulse on the cathode of each of the gating silicon rectifiers 35 and 38. Since terminal 21 is resting at substantially zero potential, terminal 40 will likewise be resting at substantially zero voltage by virture of the orientation of the silicon rectifier 36 and its connection through the RF coil 11 to terminal 21. Since the first clock pulse is a positive going pulse, this pulse cannot pass through the silicon rectifier 35 and gating circuit 13 will consequently be closed to the first clock pulse. Terminal 20 resting at substantially 3 volts will allow terminal 42 to rest at substantially 3 volts which opens the gate circuit 14 through the silicon rectifier 38 to the first clock pulse. This clock pulse is conducted by way of the capacitor 43 to the base of inverter amplifier transistor Q4 immediately turning "on" this transistor. The base of transistor Q3 immediately goes to substantially zero potential cutting "off" transistor Q3. Cutoff of transistor Q3 immediately raises the potential at terminal 21 to substantially 3 volts, the pulse produced thereby being coupled by way of capacitor 23 to the base of transistor Q2 immediately placing it into conduction to drop the voltage at terminal 20 to substantially zero. This operation through the high speed transistors Q2, Q3, and Q4 happens so rapidly that the change in potential from substantially zero to substantially 3 volts at terminal 21 occurs before the first clock pulse has decayed, as seen by the A output in FIGURE 4. Without the delay element RF coil 11, this A output could be operative through the gate 13 to cause false triggering which would produce A and B outputs as shown in dotted lines in FIGURE 4. This false triggering or secondary bistable switching of the multivibrator 10 is prevented by the RF coil 11 which delays the A output signal a few nanoseconds to produce the A′ output in time sequence as shown in FIGURE 4. Accordingly, the RF coil 11 delays the output signal a sufficient time to open the gate 13 after the complete decay of the first clock pulse and thereby re-establishes the terminal 40 to approximately 3 volts as provided in the example herein. The switch of transistor Q2 from a nonconductive state to a conductive state at the same time reduces the voltage at terminal 20 from substantially 3 volts to substantially zero volts, this delay being registered across the RF delay coil 12 to produce the voltage waveform B′ as shown in FIGURE 4. Here again the delay is sufficient to allow the first clock pulse to completely decay before gate 14 is closed.

Upon the occurrence of the second clock pulse, gate 13 is open to the clock pulse but gate 14 is closed. The second clock pulse will be conducted by way of capacitor 41 to the base of inverter amplifier transistor Q1 which reduces the base voltage of transistor Q2 to substantially zero thereby immediately cutting off transistor Q2 allowing terminal 20 to rise as shown by the output B in FIGURE 4 and voltage at terminal point 21 to be reduced to substantially zero as shown in output A in FIGURE 4 under the second clock pulse. The inverter amplifiers Q1 and Q4 supply sufficient gain to turn the saturated multivibrator from one bistable state to the other and also they provide isolation, when nonconducting, between the multivibrator transistor and the input capacitance. In FIGURE 4, the zero time line shows that switching is accomplished from the leading edge of the first clock pulse for output A and for the leading edge of the second clock pulse for the output B, the small time interval from the leading edge exemplifying the few nanoseconds required to accomplish switching. Likewise, the time interval from the voltage rise in output A to the voltage drop in output B after the first clock pulse represents the switching time in nanoseconds for the circuitry. The waveforms in FIGURE 4 also illustrate the slight "fan in" and "fan out" time element since it must be understood that FIGURE 4 represents a very, very short interval of time. If, in FIGURE 4, the width of the clockpulse is considered to be about 15 nanoseconds and the PRF of these clock pulses is at a frequency of about 20 microseconds, it may be realized that the switching of the multivibrator circuit 10 as shown by the outputs A and B is exceedingly fast, this total switching time occurring in the matter of about 10 to 15 nanoseconds. This multivibrator counter bit 10 provides logic levels of approximately two and one-half volts positive since the outputs A and B go from substantially zero to substantially 3 volts reduced by the amount of resistance of the transistors Q2 and Q3 or of the limiting diodes 32 and 33 in establishing these logic levels.

In order to complete a working example of the circuit shown in FIGURE 2 a list of the elements and their values will be given hereinbelow, although these values and the voltages illustrated in FIGURE 2 are not to be considered as limiting the invention, since other voltages and other values may be given to the various elements to accomplish other logic level outputs without detracting from the spirit and scope of providing a high speed counter bit having switching capabilities of operation in a nanosecond range. For example, as hereinabove stated, the RF coils 11 and 12 may have different electrical values to provide for different maximum PRF's of the clock pulses applied at terminal 15. Likewise the RF coils 11 and 12 may be changed from the example shown hereinbelow to provide for larger or smaller width in the clock pulses applied to terminal 15. The values of the various elements shown in FIGURE 2 are given in the following:

| | |
|---|---|
| Transistors: | |
| Q1 and Q4 | 2N708 |
| Q2 and Q3 (silicon) | 2N744 |
| R-F coils: | |
| **11** and **12** microhenries | 4.7 |
| Resistors: | |
| **22**, **24**, **44**, and **45** ohms | 1K |
| **27** and **28** do | 470 |
| **30** and **31** do | 10K |
| **46**, **47**, and **49** do | 220 |
| Capacitors: | |
| **23** and **25** micromicrofarads | 33 |
| **41** and **68** do | 68 |

By using the above elements the counter bit is capable of producing clear and proper high speed operation in a temperature range from 0° centigrade to +65° centigrade and with power supply variations of ±5 percent. Also, transient signals equal to one-half the difference between logic states are not effective to cause false triggering. Also, this counter circuit will meet all of the requirements of the normal loads demanded for digital counters without causing any ill effects in operation. The 2N744 silicon transistors were used because it was found that low storage times are achieved by their use. Thus, saturated circuitry was chosen to be used in the basic multivibrator because of the low power dissipation. Current mode operation is used to obtain low output impedances which are necessary to achieve the specified rise and fall times.

While many modifications and changes may be made in the constructional details and features of this invention without departing from the scope thereof, it is to be understood that we desire to be limited in the spirit of our invention only by the scope of the appended claims.

We claim:

1. A high speed bistable multivibrator circuit comprising:

a multivibrator having a pair of rapidly switching transistors with a control switching input to each and an output for each, the output of each transistor being coupled to switch the other transistor;

first and second gating circuits each having a pair of crystal rectifiers in anode back-to-back relation with first and second inputs and an output with the cathode of one crystal rectifier constituting said first input and the cathode of the other crystal rectifier constituting said second input, the first gating circuit having its first input coupled to one transistor output of said multivibrator and its output coupled to the control switching input of the other transistor and the second gating circuit having its first input coupled to the other transistor output and its output coupled to the control switching input of said one transistor;

an input of a pulse repetition frequency source coupled in common to said second inputs of said first and second gating circuits; and an inductive delay element in each coupling of said one transistor output and said first gating circuit first input and of said other transistor output and said second gating circuit first input whereby the output of each transistor coupled to switch the other transistor will not operate through each gating circuit to produce a secondary switching pulse following each pulse of said pulse repetition frequency source.

2. A high speed bistable multivibrator as set forth in claim 1 wherein said coupling of said gating circuit outputs to said control switching inputs of said pair of transistors includes transistor inverter amplifiers to insure switching of said pair of multivibrator transistors and to insure isolation of the conducting transistor of said pair.

3. A high speed bistable multivibrator circuit for a digital counter bit comprising a multivibrator having first and second rapidly switchable transistors with the base of each constituting first and second inputs, respectively, with the emitters thereof grounded, and with the collectors thereof constituting first and second outputs, respectively, said first output being coupled to said second input and said second output being coupled to said first input;

first and second gating circuits each including a pair of crystal rectifiers in anode back-to-back relation, said anodes of each pair being capacitor coupled through an inverter to said first and second multivibrator inputs, respectively;

first and second delay elements, said first delay element coupling the cathode of one of said pair of crystal rectifiers in said first gating circuit to said first multivibrator output and said second delay element coupling the cathode of one of said pair of crystal rectifiers in said second gating circuit to said second multivibrator output; and an input of pulse repetition frequency pulses coupled in common to the cathodes of said other crystal rectifiers of said pair in each gating circuit whereby pulses from said pulse repetition frequency input will switch said multivibrator from one bistable state to the other at a high speed rate avoiding secondary switching signals by operation of said delay elements.

4. A high speed bistable multivibrator circuit as set forth in claim 3 wherein said first output coupled to said second input and said second output coupled to said first input includes in each coupling a parallel network of a resistor and a capacitor.

5. A high speed bistable multivibrator circuit as set forth in claim 4 wherein said inverters are transistors with the bases thereof coupled respectively to said gating circuits crystal rectifier anodes, with the emitters thereof coupled to ground, and with the collectors thereof providing the coupling to said multivibrator inputs.

6. A high speed bistable multivibrator circuit as set forth in claim 5 wherein said collector of said multivibrator transistors are biased through collector load resistors from a positive voltage source and said bases of said multivibrator transistors are biased through base load resistors from a negative voltage source.

7. A high speed bistable multivibrator circuit as set forth in claim 6 wherein said multivibrator transistors and said inverter transistors are of the N-P-N type, and said delay elements are radio frequency coils.

8. A high speed bistable multivibrator circuit for a digital counter bit comprising:

a multivibrator having first and second rapidly switchable transistors with the base of each constituting first and second inputs, respectively, with the emitters thereof grounded, and with the collectors thereof constituting first and second outputs, respectively, said first output and second input and said second output and first input each being coupled through a parallel network of a resistance and a capacitance;

first and second gating circuits each including a pair of anode back-to-back coupled crystal rectifiers, said anodes of each pair of crystal rectifiers being capacitor coupled through an inverter transistor to said first and seond multivibrator inputs, respectively;

a reset input coupled through a diode and through one inverter transistor to said one input of said multivibrator to reset said multivibrator to one of its bistable states;

first and second inductive elements, said first inductive element coupling the cathode of one of said pair of crystal rectifiers in said first gating circuit to said first multivibrator output and said second inductive element coupling the cathode of one of said pair of crystal rectifiers in said second gating circuit to said second multivibrator output; and an input of pulse repetition frequency pulses coupled in common to the cathodes of the other crystal rectifiers of each pair in each gating circuit whereby pulses from said pulse repetition frequency input will rapidly switch said multivibrator from one bistable state to the other bistable state, each bistable switch producing an output signal which is delayed until after the decay of the input pulse and the closing of the gate for that bistable condition.

9. A high speed bistable multivibrator circuit for a digital counter bit comprising:

a multivibrator having first and second rapidly switchable transistors with the base of each constituting first and second inputs, respectively, with the emitters thereof grounded, and with the collectors thereof constituting first and second outputs, respectively, said first output and second input and said second output and first input each being coupled through a parallel network of a resistance and a capacitance;

a collector supply voltage applied through a collector load resistance to each multivibrator transistor collector;

a first and second inverter transistor amplifier each having a collector coupled to said multivibrator first and second inputs, having a grounded emitter, and having a base input;

a biasing voltage source coupled to the base of each multivibrator transistor to provide base biasing voltage therefor and collector voltage for said first and second inverter amplifier transistors;

first and second gating circuits each including a pair of anode back-to-back coupled crystal rectifiers, said anodes of each pair of crystal rectifiers of said first and second gating circuits being capacitor coupled to the base input of said first and second inverter transistor amplifiers, respectively, and said anodes of each pair of crystal rectifiers being biased through a biasing resistor from said collector voltage;

a reset input coupled through a diode to said first inverter transistor amplifier input to reset said multivibrator to one of its bistable states;

first and second inductive elements, said first inductive element coupling the cathode of one of said pair of crystal rectifiers in said first gating circuit to said first multivibrator output and said second inductive element coupling the cathode of one of said pair of crystal rectifiers in said second gating circuit to said second multivibrator output; and an input of pulse repetition frequency pulses coupled in common to the cathodes of the other crystal rectifiers of each pair in each gating circuit whereby pulses from said pulse repetition frequency input will rapidly switch said multivibrator from one of its bistable states to the other bistable state, the multivibrator outputs to the respective gating circuits being operative through said inductive elements to delay output pulses until after the decay of a corresponding pulse repetition frequency pulse to prevent secondary switching of said multivibrator in each bistable switching cycle without interferring with gating circuit bias.

10. A high speed bistable multivibrator as set forth in claim 9 wherein said inductive elements are radio frequency coils.

References Cited by the Examiner

UNITED STATES PATENTS

| | | | |
|---|---|---|---|
| 3,067,336 | 12/1962 | Eachus | 307—88.5 |
| 3,104,327 | 9/1963 | Rowe | 307—88.5 |

DAVID J. GALVIN, *Primary Examiner.*

ARTHUR GAUSS, *Examiner.*

J. ZAZWORSKY, *Assistant Examiner.*